United States Patent
Kawano et al.

(10) Patent No.: US 9,835,507 B2
(45) Date of Patent: Dec. 5, 2017

(54) DYNAMIC QUANTITY SENSOR

(71) Applicant: DENSO CORPORATION, Kariya, Aichi-pref. (JP)

(72) Inventors: Takahiro Kawano, Kariya (JP); Takashi Katsumata, Kariya (JP); Hisanori Yokura, Kariya (JP); Shoji Ozoe, Kariya (JP); Hiroaki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 54 days.

(21) Appl. No.: 14/910,005

(22) PCT Filed: Aug. 1, 2014

(86) PCT No.: PCT/JP2014/004039
§ 371 (c)(1),
(2) Date: Feb. 4, 2016

(87) PCT Pub. No.: WO2015/019589
PCT Pub. Date: Feb. 12, 2015

(65) Prior Publication Data
US 2016/0187215 A1    Jun. 30, 2016

(30) Foreign Application Priority Data

Aug. 6, 2013  (JP) .................................. 2013-163418
May 14, 2014  (JP) .................................. 2014-100694

(51) Int. Cl.
*G01L 9/00*    (2006.01)
*G01L 19/00*    (2006.01)

(52) U.S. Cl.
CPC .......... *G01L 9/0042* (2013.01); *G01L 9/0054* (2013.01)

(58) Field of Classification Search
CPC . G01L 9/00; G01L 9/04; G01L 9/0042; G01L 9/0054; G01L 19/00
See application file for complete search history.

(56) References Cited

U.S. PATENT DOCUMENTS 4,023,562 A * 5/1977 Hynecek .................. A61B 5/03
                                                       338/4
4,314,225 A * 2/1982 Tominaga ........... G01L 19/0084
                                                    228/262.9

(Continued)

FOREIGN PATENT DOCUMENTS

JP    2000-039371 A    2/2000
JP    2010-002405 A    1/2010

(Continued)

OTHER PUBLICATIONS

International Search Report and Written Opinion of the International Searching Authority dated Aug. 26, 2014 issued in the corresponding International application No. PCT/JP2014/004039 (and English translation).

(Continued)

*Primary Examiner* — Nguyen Ha
(74) *Attorney, Agent, or Firm* — Posz Law Group, PLC

(57) ABSTRACT

A dynamic quantity sensor includes a first substrate and a second substrate. The first substrate has one surface, another surface opposite to the one surface, and a depressed portion defining a thin portion. The second substrate has one surface attached to the first substrate and a recessed portion disposed corresponding to the depressed portion. At least a part of a first projection line obtained by projecting the recessed portion is disposed outside of a second projection line obtained by projecting a boundary line between side walls of the depressed portion and the thin portion. The thin portion disposed inside the periphery of the recessed portion provides a film portion which is displaceable corresponding to (Continued)

a physical quantity applied to the film portion, and a region sandwiched between the film portion and a portion connected to the periphery of the recessed portion provides a stress release region.

11 Claims, 9 Drawing Sheets

(56) References Cited

U.S. PATENT DOCUMENTS

| | | | |
|---|---|---|---|
| 5,591,679 A * | 1/1997 | Jakobsen | B81C 1/00301 |
| | | | 148/DIG. 12 |
| 7,216,547 B1 * | 5/2007 | Stewart | G01L 9/0042 |
| | | | 257/415 |
| 7,622,782 B2 | 11/2009 | Chu et al. | |
| 7,998,777 B1 | 8/2011 | Gamage et al. | |
| 9,518,883 B2 * | 12/2016 | Niemann | G01L 9/08 |
| 2014/0000376 A1 * | 1/2014 | Chiou | G01L 9/0052 |
| | | | 73/708 |
| 2014/0137653 A1 * | 5/2014 | Chiou | G01L 9/06 |
| | | | 73/721 |
| 2016/0016788 A1 * | 1/2016 | Yoshioka | G01P 15/0802 |
| | | | 257/415 |

FOREIGN PATENT DOCUMENTS

| | | | | |
|---|---|---|---|---|
| JP | 2012-195442 A | 10/2012 | | |
| WO | WO 2008058169 A2 * | 5/2008 | | G01L 9/0051 |

OTHER PUBLICATIONS

Office Action dated Mar. 31, 2015 issued in the corresponding JP application No. 2014-100694 (and English translation).

* cited by examiner

DYNAMIC QUANTITY SENSOR

CROSS REFERENCE TO RELATED APPLICATIONS

This application is the U.S. national phase of International Patent Application No. PCT/JP2014/004039 filed on Aug. 1, 2014 and is based on Japanese Patent Application No. 2013-163418 filed on Aug. 6, 2013 and Japanese Patent Application No. 2014-100694 filed on May 14, 2014, the disclosures of which are incorporated herein by references.

TECHNICAL FIELD

The present disclosure relates to a dynamic quantity sensor having a film portion which is displaced in accordance with a physical quantity.

BACKGROUND ART

Conventionally, as a dynamic quantity sensor of the above-described type, a pressure sensor described below has been proposed (see, e.g., Patent Literature 1).

Specifically, in this kind of pressure sensor, one surface of a first substrate is joined to a second substrate. In the first substrate, a depressed portion is provided at a part of another surface opposite to the one surface joined with the second substrate. Thus, a thin portion is formed in the first substrate on one surface corresponding to the depressed portion formed on another surface of the first substrate. In the thin portion, a gauge resistor is disposed, and a resistance value of the gauge resistor changes in accordance with a pressure applied to the gauge resistor. In the second substrate, a recessed portion is formed on one surface joined with the one surface of the first substrate so that the recessed portion faces the depressed portion to form a reference pressure chamber between the second substrate and the first substrate and seals the gauge resistor in the reference pressure chamber.

In the pressure sensor, a film portion which is displaced in accordance with a pressure is provided by the thin portion of the first substrate. When a pressure is applied to the film portion, the film portion is displaced to change the resistance value of the gauge resistor so that an electric signal corresponding to the resistance value is output as a sensor signal.

The manufacturing method of the above-described pressure sensor includes preparing the first substrate to which the gauge resistor is attached, providing the recessed portion in the second substrate, bonding the first and second substrates to each other, and forming the depressed portion in the first substrate.

In the above-described pressure sensor, the relationship between the depressed portion formed in the first substrate and the recessed portion formed in the second substrate is not specifically defined. As a result, a problem arises as the following. When a boundary line (end portion of the thin portion J1a) of the thin portion J1a, which is defined by side walls of the depressed portion J1 and the depressed portion J1, is longer than an open end of the recessed portion J3 as shown in FIG. 10, the film portion J5 is likely to be displaced due to the stress generated when the first substrate J2 and the second substrate J4 are bonded to each other.

In other words, the stress generated when the first and second substrates J2 and J4 are bonded to each other is likely to be concentrated on an end portion of the junction region between the first and second substrates J2 and J4. That is, the stress is likely to be concentrated on the first substrate J2 at a portion where the first substrate is connected to the open end of the recessed portion J3 of the second substrate.

In the above-described configuration, the boundary line between the side walls of the depressed portion J1 and the thin portion J1a is longer than the open end of the recessed portion J3. Thus, the film portion J5, which is displaceable (deformable) in accordance with an applied pressure, is disposed within a part of the thin portion J1a of the first substrate J2 which faces the open end of the recessed portion J3. That is, the film portion J5 is defined by the open end of the recessed portion J3. In other words, the film portion J5 has a length equal to a length of the open end of the recessed portion J3. As a result, the stress generated in the portion of the first substrate J2 which faces to the open end of the recessed portion J3 is applied directly to the film portion J5. Consequently, the film portion J5 is likely to be displaced by the stress, and this kind of displacement may cause fluctuations in output signals.

The above-described pressure having the film portion is described as an example. However, a similar problem also arises in an acceleration sensor or angular velocity sensor having a thin film structure and formed of first and second substrates bonded to each other.

PRIOR ART LITERATURE

Patent Literature

[Patent Literature 1] JP 2012-195442 A

SUMMARY OF INVENTION

In view of the foregoing difficulties, it is an object of the present disclosure to provide a dynamic quantity sensor which can restrict a displacement of a film portion when a stress caused by a bonding of the first and second substrates to each other is applied to the film portion.

According to an aspect of the present disclosure, a dynamic quantity sensor includes a first substrate and a second substrate. The first substrate has one surface, another surface opposite to the one surface, and a depressed portion defining a thin portion in a vicinity of the one surface. The second substrate has one surface attached to the one surface of the first substrate and a recessed portion. The recessed portion is disposed in a vicinity of the one surface to face the depressed portion and define a sealing space between the first substrate and the second substrate.

The recessed portion has a shape such that at least a part of a first projection line corresponding to the recessed portion is disposed at an outer area of a second projection line corresponding to the depressed portion. The first projection line is obtained by projecting a periphery of an open end of the recessed portion on the one surface of the first substrate, and the second projection line is obtained by projecting a boundary line between side walls of the depressed portion and the thin portion on the one surface of the first substrate. In the first substrate, a part of the thin portion which is disposed inside the periphery of the open end of the recessed portion provides a film portion, and the film portion is displaceable in accordance with a physical quantity applied to the film portion. In the first substrate, a region between the film portion and a portion connected to the periphery of the open end of the recessed portion provides a stress release region.

In the above dynamic quantity sensor, the stress release region is able to release the stress which is generated when the first and second substrates are bonded to each other or the like, and accordingly, restrict a displacement of the film portion due to the stress.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Figure 1:
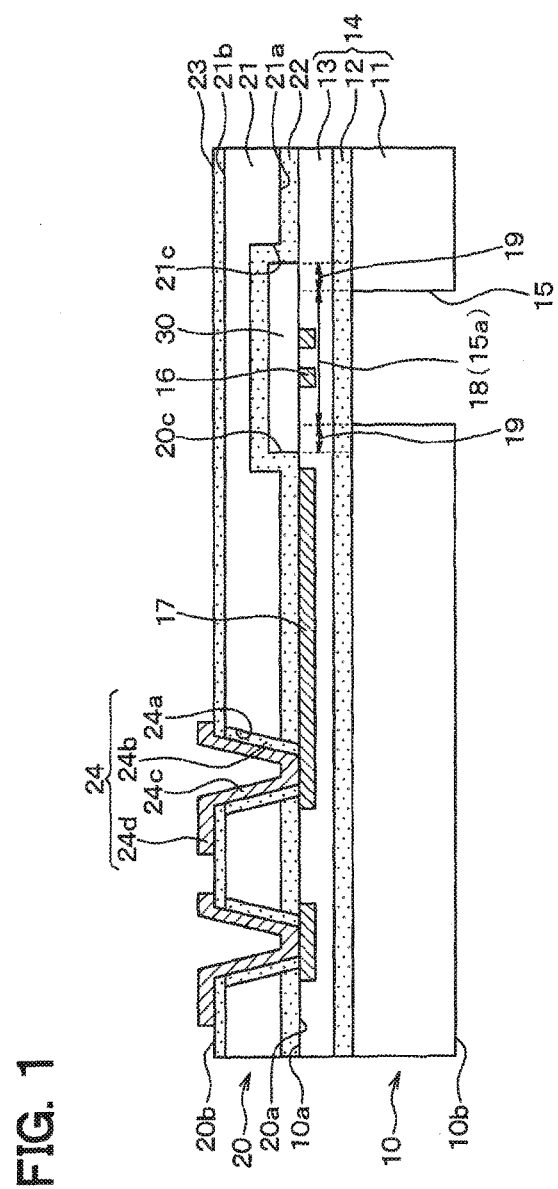
FIG. 1 is a cross-sectional view of a pressure sensor in a first embodiment of the present disclosure.

The following will describe embodiments of the present disclosure with reference to the drawings. In the following description of the various embodiments, same reference characters or numerals designate same or equivalent component parts.

First Embodiment

The following will describe a first embodiment of the present disclosure with reference to the drawings. The present embodiment will describe an example in which a dynamic quantity sensor according to the present disclosure is applied to a pressure sensor.

As shown in FIG. 1, the pressure sensor in the present embodiment includes a cap 20 and a sensor substrate 10 to which the cap 20 is joined. In the present embodiment, the sensor substrate 10 corresponds to a first substrate in the present disclosure, and the cap 20 corresponds to a second substrate in the present disclosure.

The sensor substrate 10 is provided by an SOI (Silicon on Insulator) substrate 14, which has a rectangular plate shape. The SOI substrate 14 includes a supporting substrate 11, an insulating film 12, and a semiconductor layer 13, which are stacked in described order. It is defined that the surface of the semiconductor substrate 13 which is opposite to the insulating film 12 is one surface 10a of the sensor substrate 10 and the surface of the supporting substrate 11 which is opposite to the insulating film 12 is another surface 10b of the sensor substrate 10.

In the present embodiment, the SOI substrate 14 corresponds to a semiconductor substrate in the present disclosure. As the supporting substrate 11 and the semiconductor layer 13, a silicon substrate may be used. As the insulating film 12, an oxide film ($SiO_2$) or the like may be used. The supporting substrate 11 in the present embodiment has a thickness of about 300 μm.

The supporting substrate 11 includes a depressed portion 15. The depressed portion 15 has a rectangular shape in cross-sectional view and reaches the insulating film 12, and is disposed close to one end portion (right end portion on the surface of a paper sheet with FIG. 1) of the supporting substrate 11. The depressed portion 15 disposed on the supporting substrate 11 defines a thin portion 15a in the supporting substrate 11. In the present embodiment, the thin portion 15a includes an insulating film 12, which functions as a bottom surface (bottom portion) of the depressed portion 15, and the semiconductor layer 13. Within the thin portion 15a, the semiconductor layer 13 is provided with gauge resistors 16 each having a resistance value which changes in accordance with an applied pressure.

In the present embodiment, the bottom surface (thin portion 15a) of the depressed portion 15 has a square two-dimensional shape. FIG. 1 shows the depressed portion 15 in which a width (length) between side walls is constant. However, the depressed portion 15 may have a tapered shape in which the width (length) between the side walls increases with a distance from the one surface 10a toward the other surface 10b.

In the semiconductor layer 13, a wiring layer 17 is formed to be close to the other end portion (left end portion on the surface of the paper sheet with FIG. 1) compared with the thin portion 15a. The wiring layer 17 is properly arranged in the semiconductor layer 13 to electrically connect the connection points of the individual gauge resistors 16.

The cap 20 has a silicon substrate 21 having one surface 21a and another surface 21b, an insulating film 22 disposed on the one surface 21a of the silicon substrate 21 and having a thermal expansion coefficient different from those of the silicon substrate 21 and the semiconductor layer 13, and an insulating film 23 disposed on the other surface 21b of the silicon substrate 21. The insulating film 22 is joined to the semiconductor layer 13.

In the present embodiment, one surface of the insulating film 22 which is opposite to the silicon substrate 21 is defined as one surface 20a of the cap 20, and one surface of the insulating film 23 which is opposite to the silicon substrate 21 is defined as another surface 20b of the cap 20. In the present embodiment, the silicon substrate 21 corresponds to a substrate in the present disclosure, and the insulating film 22 corresponds to a joining member in the present disclosure.

The cap 20 has a recessed portion 20c. The recessed portion 20c is provided by a recessed portion 21c defined in the silicon substrate 21. The recessed portion 21c is disposed facing the semiconductor layer 13 at a portion which corresponds to the bottom surface of the depressed portion 15. As a result, between the sensor substrate 10 and the cap 20, a reference pressure chamber 30 which seals the gauge resistors 16 is provided by a space defined by the sensor substrate 10 and the recessed portion 20c. In the present embodiment, as will be described later, the sensor substrate 10 and the cap 20 are joined together under a vacuum condition so that the reference pressure chamber 30 is under a vacuum pressure. In the present embodiment, the reference pressure chamber 30 corresponds to a sealing space in the present disclosure.

The insulating film 22 insulates the sensor substrate 10 from the silicon substrate 21. The insulating film 22 is made of an insulating material such as an oxide film ($SiO_2$), and is disposed on an entire one surface 21a of the silicon substrate 21.

Figure 2:
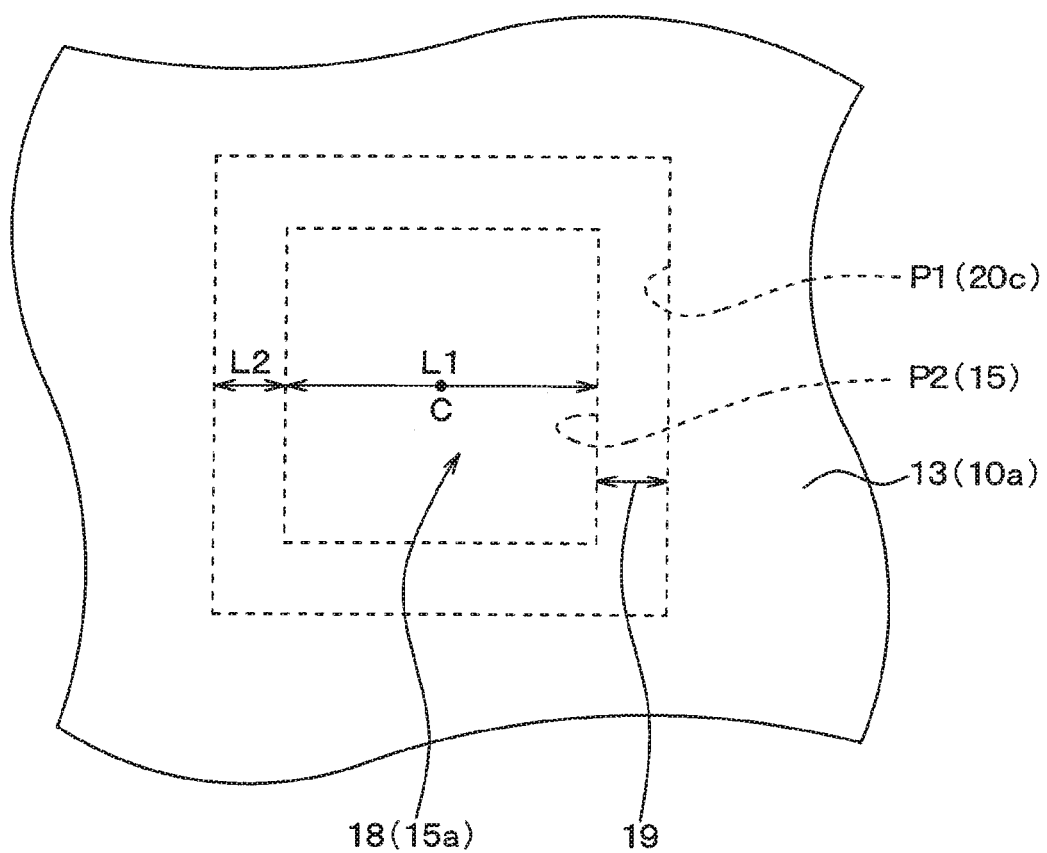
FIG. 2 is a plan view of a vicinity of a part of a semiconductor layer shown in FIG. 1 which forms a film portion.

The following will describe a relationship between the depressed portion 15 and the recessed portion 20c in the present embodiment. As shown in FIGS. 1 and 2, the recessed portion 20c is configured to have a shape such that at least a part of a first projection line P1 corresponding to the recessed portion 20c is disposed at an outside area of a second projection line P2 corresponding to the depressed portion 15. Herein, the first projection line P1 corresponding to the recessed portion 20 is obtained by projecting the open end of the recessed portion 20c on the one surface 10a of the sensor substrate 10. The second projection line P2 corresponding to depressed portion 15 is obtained by projecting the boundary line between the side walls of the depressed portion 15 and the thin portion 15a formed by the depressed portion 15. In the present embodiment, the recessed portion 20c has a shape such that the first projection line P1 corresponding to the recessed portion 20 surrounds the second projection line P2 corresponding to the depressed portion 15.

In FIG. 2, the first projection line P1 and the second projection line P2 are shown by the dotted lines. In other words, the boundary line between the side walls of the depressed portion 15 and the thin portion 15a formed by the depressed portion 15 is the end portions of the side walls of the depressed portion 15 which are close to the one surface 10a, or the end portions of the thin portion 15a.

The insulating film 22 is joined with a remaining portion of the semiconductor layer 13 except the thin portion 15a disposed in the semiconductor layer 13. Accordingly, a sensible film portion 18 of the sensor substrate 10 which is displaceable (deformable) in accordance with a pressure includes partial portion of the semiconductor layer 13 and partial portion of the insulating film 12, which function as the thin portion 15a. That is, the end portions of the film portion 18 are defined by the end portions of the side walls of the depressed portion 15 which are disposed close to the one surface 10a. In the semiconductor layer 13, a region between the end portions of the film portion 18 and a portion connected with an edge of the open end of the recessed portion 20c configure a stress release region 19.

As shown in FIG. 1, the cap 20 has a plurality of through electrode portions 24 penetrating the cap 20 in a stacking direction of the sensor substrate 10 and the cap 20.

Specifically, in each of the through electrode portions 24, an insulating film 24b is formed on a wall surface of a through hole 24a. The through hole 24a extends through the silicon substrate 21 and the insulating film 22 to expose the wiring layer 17. A through electrode 24c is formed on the insulating film 24b to be electrically connected to the wiring layer 17. In the through electrode portion 24, a portion which is connected to the through electrode 24c and disposed on the insulating film 23 functions as a pad portion 24d, and the pad portion is electrically connected to an external circuit via a wire or the like.

For the insulating film 24b, e.g., tetraethyl orthosilicate (TEOS) or the like may be used. As the through electrode 24c and the pad portion 24d, e.g., metals such as aluminum or the like may be used.

In such a pressure sensor, the stress release region 19 can release the stress generated when the sensor substrate 10 and the silicon substrate 21 having the insulating film 22 are bonded to each other. Further, the the stress release region 19 can release the stress generated when high-temperature anneal or the like is performed after the bonding or the like.

Figure 3:
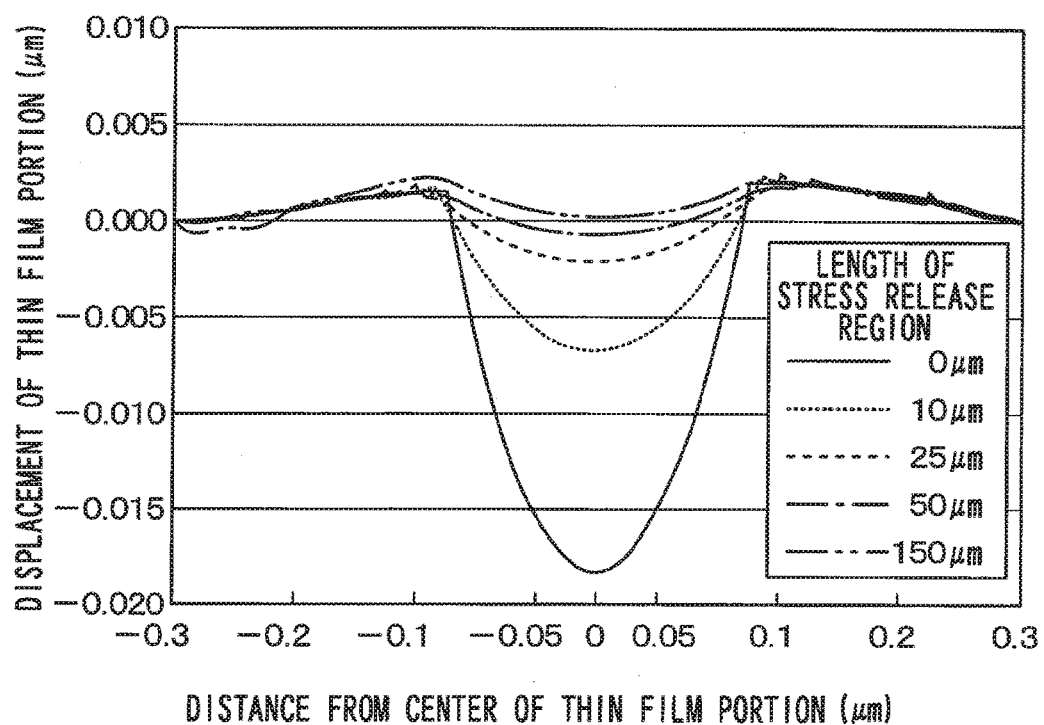
FIG. 3 is a simulation result showing a relationship between a length of a stress release region and an amount of displacement of a film portion.
Figure 4:
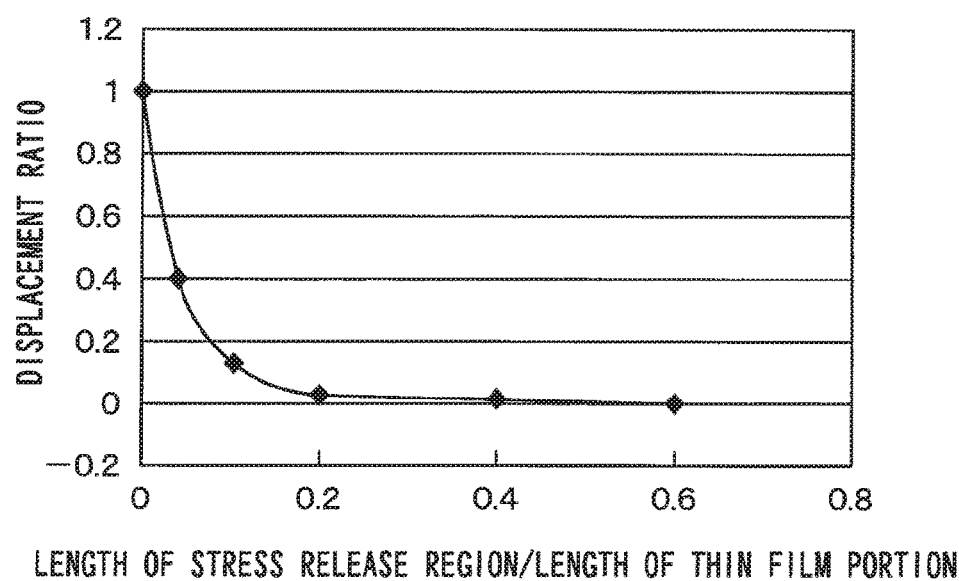
FIG. 4 is a simulation result showing a relationship between a ratio of a length of a stress release region to a length of the film portion and a ratio of the displacement amount.

The following will describe a relationship between the film portion 18 and the stress release region 19 with reference to FIGS. 3 and 4. FIG. 3 is a simulation result when the film portion 18 has a square shape in which each side has a length of 250 μm. Suppose that a length in a direction from a center of the film portion 18 toward the one end portion of the semiconductor layer 13 has a positive value, and a length in a direction from the center of the film portion 18 toward the other end portion of the semiconductor layer 13 has a negative value. In FIG. 4, length of the film portion indicates the length L1 shown in FIG. 2. Herein, the length of the film portion is the shortest length (width) of the film portion 18 along an imaginary line passing through the center C. In FIGS. 3 and 4, length of stress release region indicates the length L2 shown in FIG. 2, which is the shortest length of a distance between the first projection line P1 and the second projection line P2. In FIGS. 3 and 4, displacement of the thin film portion indicates a displacement amount when no pressure is applied to the film portion 18. In FIG. 4, displacement ratio is determined with a displacement amount of the center of the film portion 18 when the first projection line P1 and the second projection line P2 coincide with each other (when the end portions of the film portion 18 are defined by a periphery of the open end of the recessed portion 20c).

As shown in FIG. 3, the displacement of the film portion 18 decreases as the length of the stress release region is increased. As shown in FIG. 4, the displacement ratio abruptly decreases when the ratio of the length L2 of the stress release region to the length L1 of the film portion is lower than 0.2. When the ratio exceeds 0.2, the displacement ratio barely changes. That is, as long as the ratio of the length L2 of the stress release region to the length L1 of the film portion is adjusted to be equal to or higher than 0.2, the stress release effect of the stress release region 19 can sufficiently be obtained. Accordingly, in the present embodiment, the ratio of the length L2 of the stress release region to the length L1 of the film portion is adjusted to be equal to or higher than 0.2. The ratio of the length L2 of the stress release region to the length L1 of the film portion may also be adjusted to be equal to or higher than 0.2 and equal to or lower than 1.2, be equal to or higher than 0.2 and equal to or lower than 2, be equal to or higher than 0.2 and equal to or lower than 3. Under these ratios, the stress release region 19 also can provide the stress release effect.

The above description is about the configuration of the pressure sensor in the present embodiment. The following will describe a manufacturing method of the pressure sensor having the above-described structure with reference to FIGS. 5A to 5D.

Figure 5A:
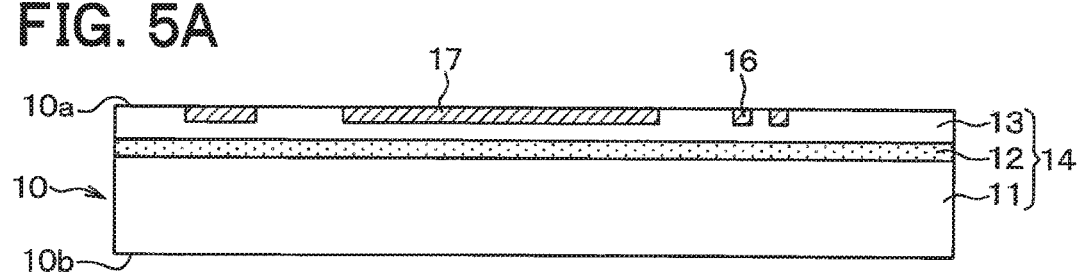
FIGS. 5A to 5D are cross-sectional views showing manufacturing processes of the pressure sensor shown in FIG. 1.

First, as shown in FIG. 5A, the SOI substrate 14 is prepared, and the gauge resistors 16 and the wiring layer 17 are disposed in the semiconductor layer 13.

The SOI substrate 14 is prepared by, e.g., forming the insulating film 12 on the supporting substrate 11 or on the semiconductor layer 13, and bonding the supporting substrate 11 to the semiconductor layer 13 with the insulating film 12 being sandwiched therebetween. For the SOI substrate 14 as described above, the bonding of the supporting substrate 11 and the semiconductor layer 13 to each other is performed in a state where the depressed portion 15 is not formed. As a result, the stress generated during the bonding is likely to be concentrated on the end portion (end portion of a junction region) of the SOI substrate 14.

Figure 5B:
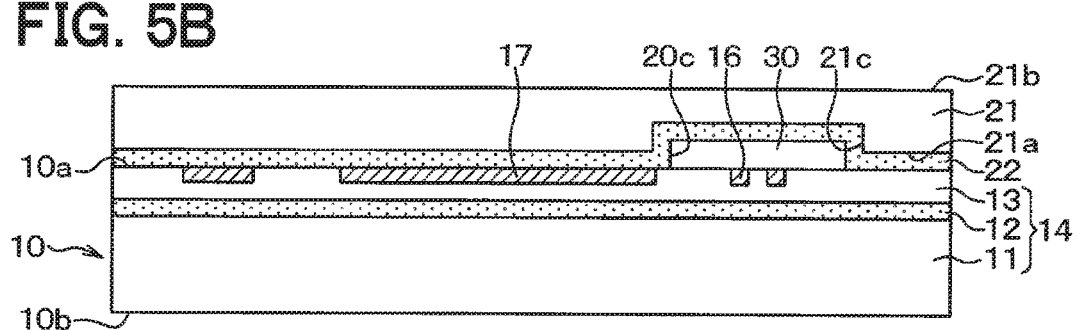

As shown in FIG. 5B, the silicon substrate 21 providing the cap 20 is prepared. The recessed portion 21c is defined in the silicon substrate 21. Subsequently, on the one surface 21a of the silicon substrate 21, the insulating film 22 is generated by a thermal oxidation method, a CVD (Chemical Vapor Deposition) method, or the like. Then, the silicon substrate 21 on which the insulating film 22 is disposed is bonded to the semiconductor layer 13 in the SOI substrate 14. The method for bonding of the semiconductor layer 13 and the insulating film 22 to each other is not specifically limited. For example, the bonding can be performed by direct joining.

The SOI substrate 14 and the silicon substrate 21 to which the insulating film 22 is attached are placed in a vacuum device. Then, $N_2$ plasma beam, $O_2$ plasma beam, or Ar ion beam is applied to the semiconductor layer 13 and the insulating film 22 in order to activate the respective surfaces (surfaces to be bonded) of the semiconductor layer 13 and the insulating film 22.

Next, in the vacuum device, using the alignment marks properly provided in the SOI substrate 14 and the silicon substrate 21, alignment is performed with an infrared microscope or the like, and then the semiconductor layer 13 and the insulating film 22 are bonded to each other at a temperature ranging from a room temperature to 550° C. Thus, the reference pressure chamber 30 of a vacuum state is formed between the sensor substrate 10 and the recessed portion 20c.

The direct joining has been described as an example. Alternatively, the semiconductor layer 13 and the insulating film 22 may also be joined together using a joining technique such as anode joining, intermediate layer joining, or fusion joining. After the joining, treatment for improving joining quality, such as high-temperature anneal, may also be performed. Also, after the joining, the silicon substrate 21 may also be ground or polished from the other surface 21b and processed to have an intended thickness.

Figure 5C:
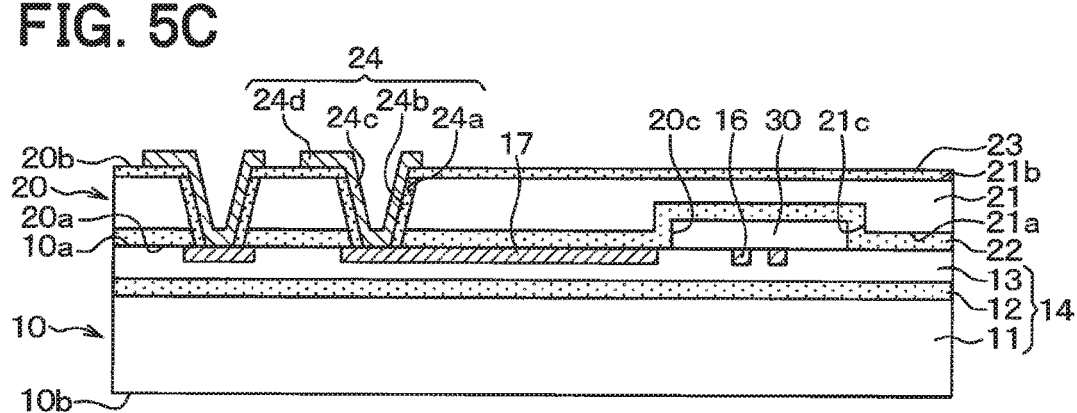

Subsequently, as shown in FIG. 5C, in the cap 20, the multiple electrode portions 24 are formed. Specifically, on the other surface 21b of the silicon substrate 21, a mask not shown in formed and dry etching or the like is performed to form multiple through holes 24a reaching the wiring layer 17. Next, on the wall surface of each of the through holes 24a, the insulating film 24b made of TEOS or the like is deposited. At this time, the insulating film 23 is formed on the other surface 21b of the silicon substrate 21. That is, the insulating films 23 and 24b are formed in the same step.

Then, the insulating film 24b formed on the bottom portion of each of the through holes 24a is removed to expose the wiring layer 17 from each of the through holes 24a. Then, in each of the through holes 24a, a metal film is formed by a sputtering method, a vapor deposition method, or the like to form the through electrode 24c electrically connected to the wiring layer 17. The metal film formed on the insulating film 23 is patterned as required to form the pad portion 24d. Thus, in the cap 20, multiple through electrode portions 24 are formed.

Figure 5D:
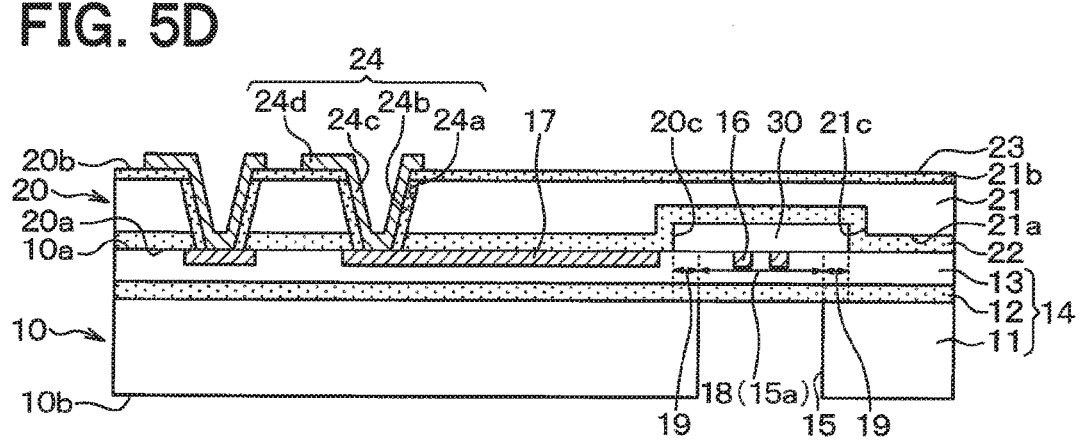

Subsequently, as shown in FIG. 5D, a mask not shown is disposed on the other surface 10b of the sensor substrate 10, and dry etching or the like is performed for forming the depressed portion 15 which satisfies a positional relationship with the recessed portion 20c as described above. In this manner, the sensor substrate 10 is formed with the film portion 18 (thin portion 15a), and the pressure sensor is manufactured.

The end portions of the film portion 18 are defined by the end portions of the side walls of the depressed portion 15 which are disposed close to the one surface 10a. When the depressed portion 15 is formed in the step in FIG. 5D, the insulating film 12 is used as an etching stopper for simplifying the manufacturing process. In the foregoing description, an exemplary manufacturing method of the pressure sensor is described. Alternatively, it may also be possible that the SOI substrate 14 and the silicon substrate 21 each in the form of a wafer are prepared, bonded to each other, and then cut by dicing into unit chips.

As described above, in the pressure sensor of the present embodiment, the region of the sensor substrate 10 which is disposed between each end portion of the film portion 18 and the portion of the sensor substrate 10 which is contacted with the periphery of the open end of the recessed portion 20c functions as the stress release region 19. Accordingly, the stress release region 19 is able to reduce the stress generated when the sensor substrate 10 and the silicon substrate 21 to which the insulating film 22 is attached are bonded to each other or the stress generated when high-temperature anneal or the like is performed after the bonding. Thus, the film portion 18 can be protected from being displaced due to such kind of stress. This can restrict fluctuations in output signals of the pressure.

The ratio of the length L2 of the stress release region to the length L1 of the film portion is adjusted to be equal to or higher than 0.2. Therefore, the stress release region 19 is able to sufficiently reduce the stress generated when the sensor substrate 10 and the silicon substrate 21 to which the insulating film 22 is attached are bonded to each other, the stress generated when high-temperature anneal or the like is performed after the bonding, or the like. With this configuration, a displacement of the film portion 18 can be restricted with a higher reliability.

Second Embodiment

The second embodiment of the present disclosure will be described. The present embodiment is obtained by modifying the configuration of the sensor substrate 10 in the first embodiment. The present embodiment is similar to the first embodiment, and a description of the similar or same portion is omitted hereinafter for simplification.

Figure 6:
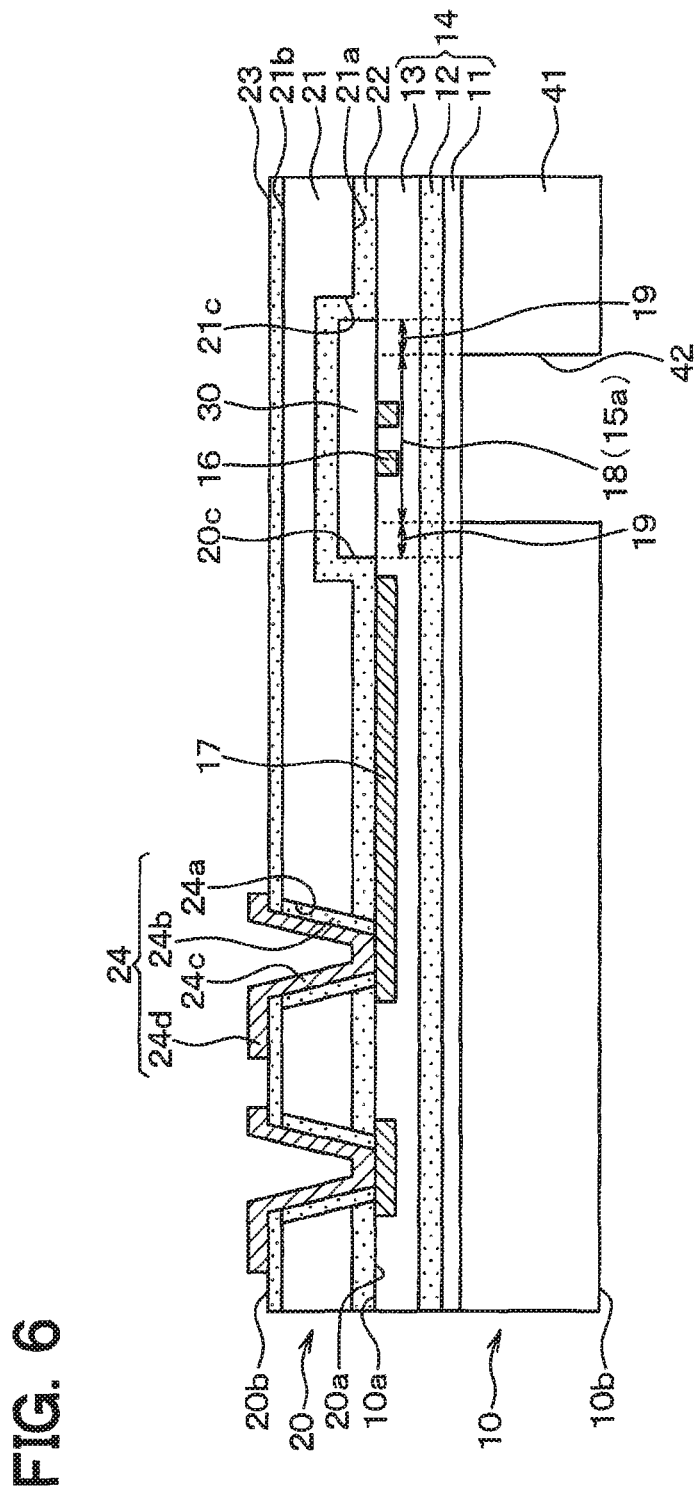
FIG. 6 is a cross-sectional view of a pressure sensor in a second embodiment of the present disclosure.

As shown in FIG. 6, in the present embodiment, the sensor substrate 10 is configured such that a pedestal 41 made of glass or the like is joined to the supporting substrate 11 of the SOI substrate 14. That is, in the present embodiment, the surface of the pedestal 41 which is opposite to the supporting substrate 11 is used as the other surface 10b of the sensor substrate 10.

In the present embodiment, the supporting substrate 11 is provided with a thickness within a range of 1 to 10 μm. This thickness of the supporting substrate is thinner than the thickness of the supporting substrate 11 described in the first embodiment.

In the pedestal 41, a depressed portion 42 having a rectangular shape in cross-sectional view is formed to extend from the other surface 10b of the sensor substrate 10 and reach the supporting substrate 11. That is, in the present embodiment, the film portion 18 is formed of partial portion of the SOI substrate 14. The partial portion of the SOI substrate providing the film portion also provides bottom portion of the depressed portion 42.

In such a pressure sensor, the end portions of the film portion 18 are defined by the end portions of the side walls of the depressed portion 42 which are disposed close to the one surface 10a, and the stress release region 19 is formed in the sensor substrate 10. Accordingly, similar effect as obtained in the first embodiment can be obtained by the pressure sensor of the second embodiment.

Such a pressure sensor is formed by polishing or grinding the supporting substrate 11 after the step in FIG. 5C described above to thin the supporting substrate 11, joining the pedestal 41 to the supporting substrate 11, and then forming the depressed portion 42 in the pedestal 41.

Third Embodiment

A third embodiment of the present disclosure will be described. The present embodiment is obtained by modifying the configuration of the pedestal 41 in the second embodiment. The present embodiment is similar to the second embodiment, and a description of the similar or same portion will be omitted for simplification.

Figure 7:
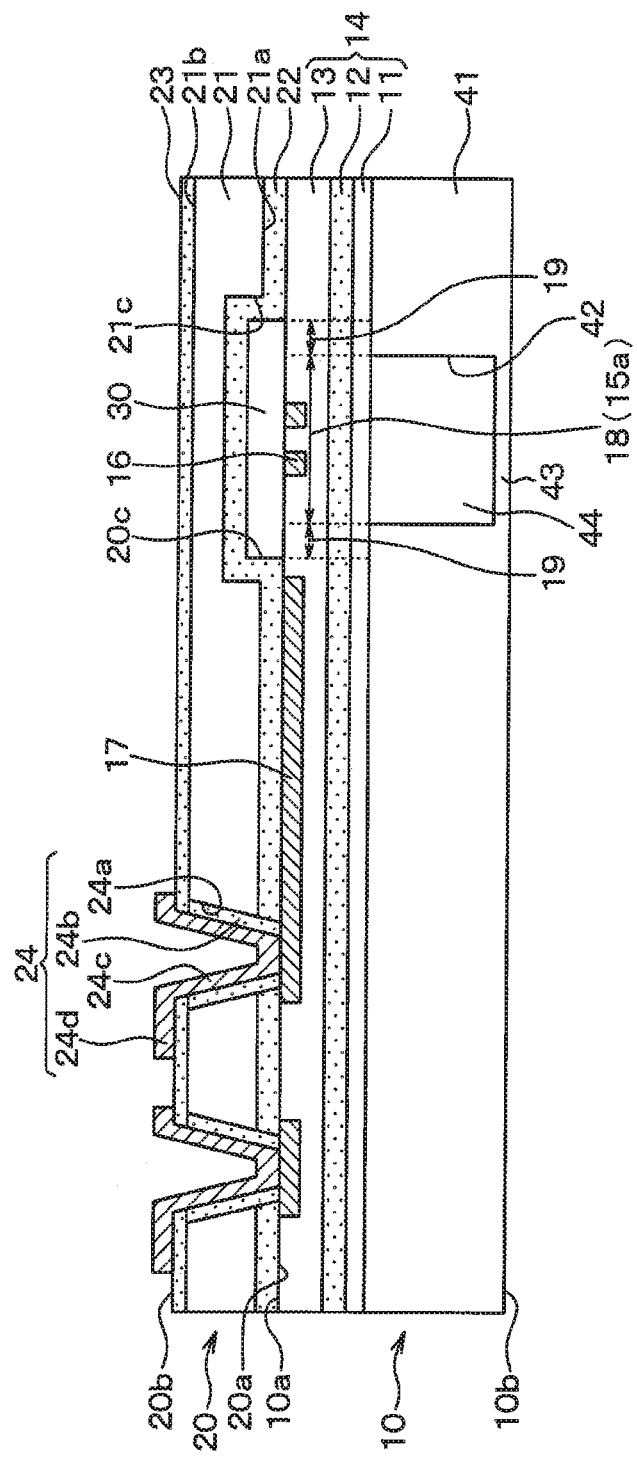
FIG. 7 is a cross-sectional view of a pressure sensor in a third embodiment of the present disclosure.

As shown in FIG. 7, in the present embodiment, the pedestal 41 has the depressed portion 42 disposed on a side of the supporting substrate 11, and the other surface 10b of the sensor substrate 10 has a film portion 43 having a small thickness due to the depressed portion 42 disposed in the pedestal 42. The space between the supporting substrate 11 and the depressed portion 42 forms a sealing space 44.

In such a pressure sensor, the end portions of the film portion 18 are defined by the end portions of the side walls of the depressed portion 42 which are disposed on a side of the one surface 10a, and the stress release region 19 is formed in the sensor substrate 10. Accordingly, similar effect as obtained in the second embodiment can be obtained by the pressure sensor of the third embodiment.

In such a pressure sensor, when a pressure is applied to the film portion 43, the film portion displaces corresponding to the applied pressure, and accordingly, the pressure in the sealing space 44 formed between the depressed portion 42 and the SOI substrate 14 varies with the displacement of the film portion 43. Consequently, the film portion 18 is displaced in accordance with the pressure variation in the sealing space 44, and a sensor signal in accordance with the applied pressure is output from the film portion 18.

Other Embodiments

The present disclosure is not limited to the embodiments described above and can be properly modified as follows.

For example, in each of the foregoing embodiments, the pressure sensor is described as an example of the dynamic quantity sensor. Alternatively, the present disclosure is also applicable to an accelerator sensor or an angular velocity sensor having a film portion to sense the applied pressure.

Also, in each of the foregoing embodiments, instead of the SOI substrate 14, a silicon substrate or the like can also be used as the sensor substrate 10. In a case where a silicon substrate is used as the sensor substrate 10, when the sensor substrate 10 and the cap 20 are bonded to each other or when high-temperature anneal or the like is performed after the bonding, it is possible to more reliably restrict a stress from being generated in the sensor substrate 10 than in a case where the SOI substrate 14 having the insulating film 12 is used as the sensor substrate 10. This can restrict a deformation of the sensor substrate 10 a concentration of stress on the portion of the sensor substrate 10 which is connected to a periphery of the open end of the recessed portion 20c.

In each of the foregoing embodiments, instead of the insulating film 22 as the joining member, a dielectric material, a metal film, or the like may also be used. When a metal film or the like is used as the joining member, it is preferable to perform predetermined treatment on the semiconductor layer 13 and the silicon substrate 21 and thus provide insulation between the semiconductor layer 13 and the silicon substrate 21. It may also be possible to directly join the semiconductor layer 13 and the silicon substrate 21 to each other without using the joining member. As the pedestal 41, a semiconductor substrate such as a silicon substrate may also be used instead of a glass substrate or the like.

In each of the foregoing embodiments, the film portion 18 (thin portion 15a) may also be formed only of the semiconductor layer 13.

Also, in each of the foregoing embodiments, the film portion 18 (thin portion 15a) may also have, e.g., a rectangular or rhomboidal shape or a circular shape instead of a square shape.

Figure 8:
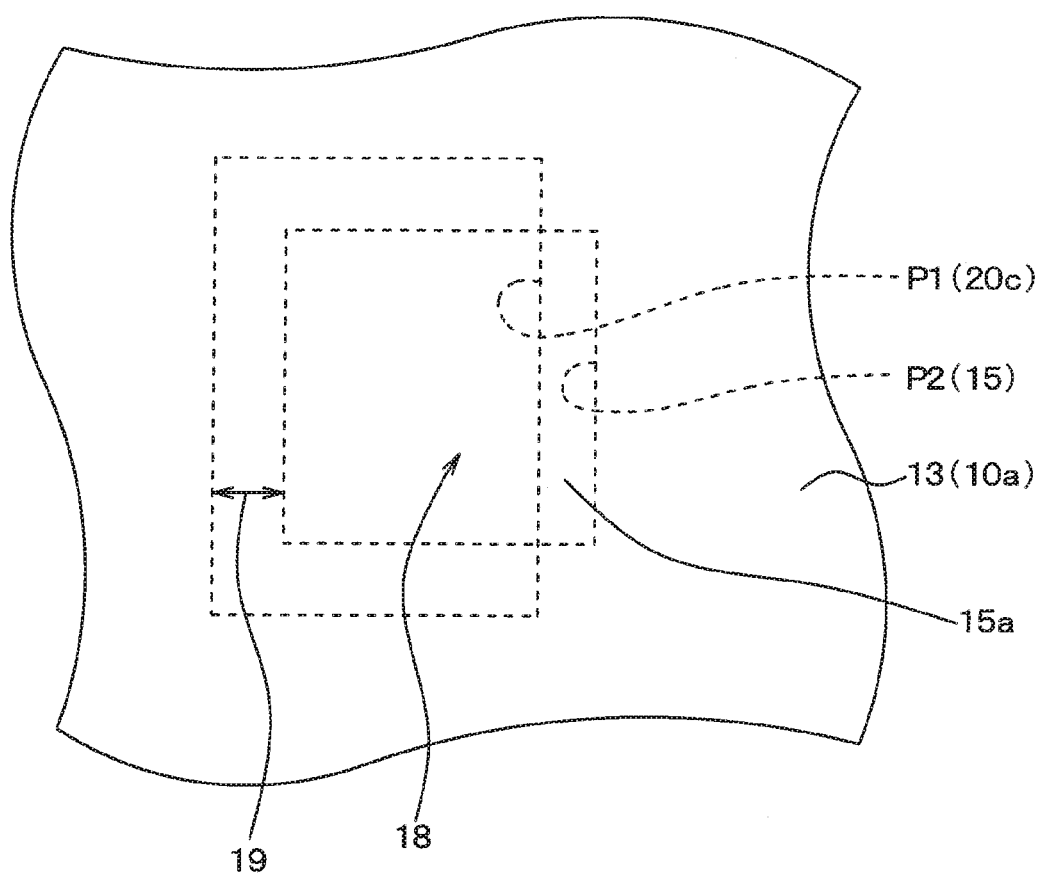
FIG. 8 is a plan view of a vicinity of a part of a semiconductor layer which forms a film portion in another embodiment of the present disclosure.

In each of the foregoing embodiments, as shown in FIG. 8, the recessed portion 20c may also be formed such that a part of the first projection line P1 is located inside the second projection line P2. In this case, the film portion 18 is formed of the portion of the thin portion 15a which is surrounded by the recessed portion 20c (first projection line P1) of the thin portion 15a. In such a pressure sensor, the stress release region 19 is formed of the region of the semiconductor layer 13 which is located between the end portions of the portion of the semiconductor layer 13 which forms the film portion 18 and the portion of the semiconductor layer 13 which is connected to the periphery of the open end of the recessed portion 20c. In FIG. 8, the stress release region 19 is not formed around the portion of the film portion 18 which is shown on the right-side part of the paper sheet with the drawing. In such a pressure sensor also, the stress release region 10 is able to reduce the stress generated when the sensor substrate 10 and the silicon substrate 21 formed with the insulating film 22 are bonded to each other or the stress generated when high-temperature anneal or the like is performed after the bonding. This can restrict the displacement of the film portion 18 due to the bonding stress or the like.

Figure 9:
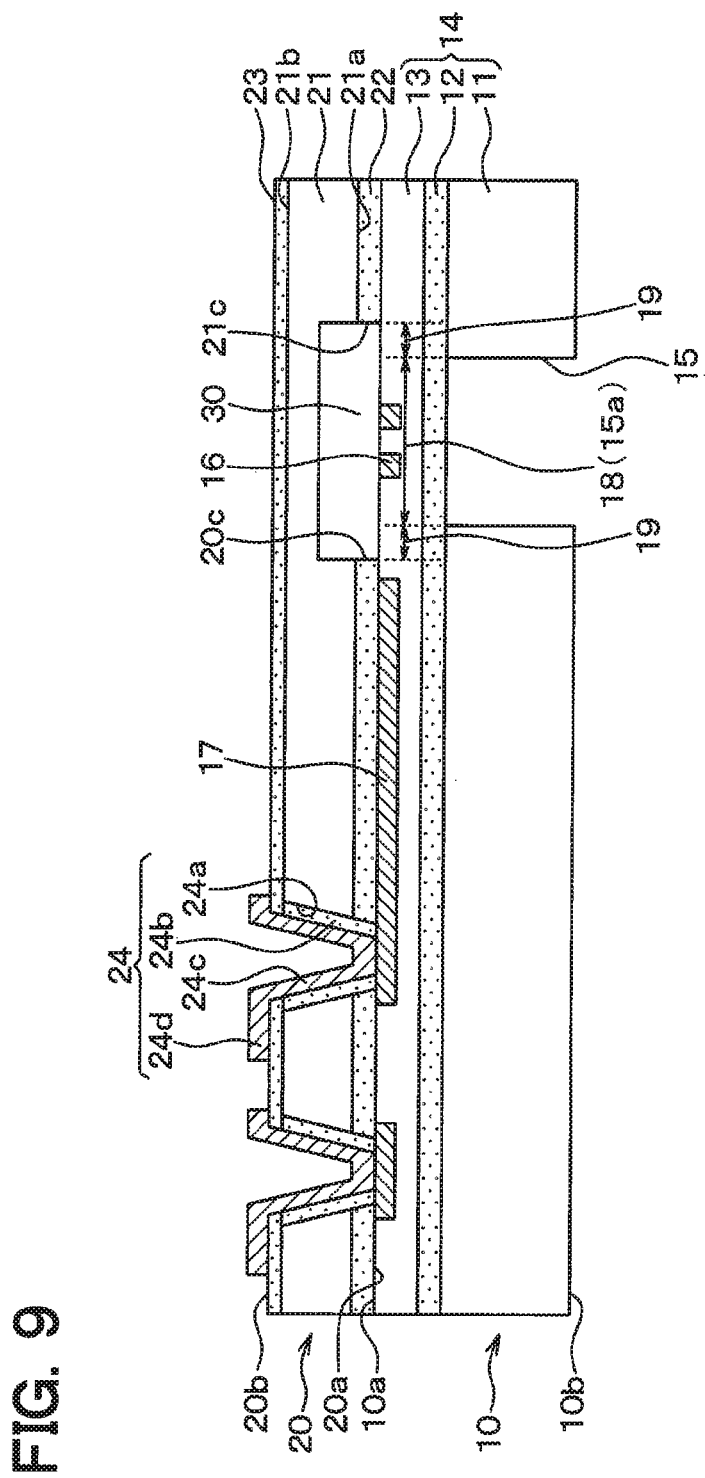
FIG. 9 is a cross-sectional view of a pressure sensor in another embodiment of the present disclosure.
Figure 10:
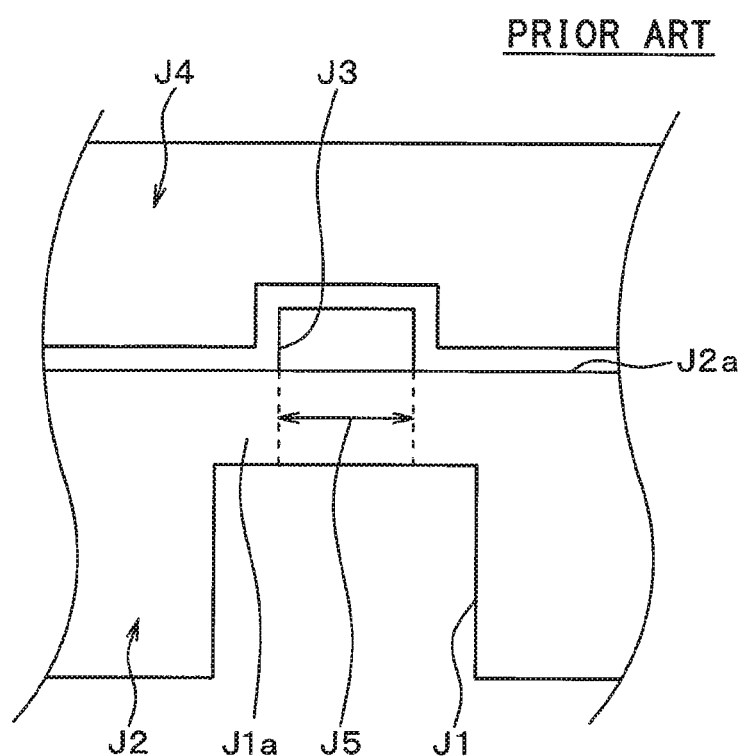
FIG. 10 is a cross-sectional view of a pressure sensor according to a prior art.

Also, in each of the foregoing embodiments, as shown in FIG. 9, the insulating film 22 may be removed from a surface of the recessed portion 21c.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A dynamic quantity sensor comprising:
   a first substrate having one surface, another surface opposite to the one surface, and a depressed portion defining a thin portion in a vicinity of the one surface; and
   a second substrate having one surface attached to the one surface of the first substrate and a recessed portion, and the recessed portion being disposed in a vicinity of the one surface corresponding to the depressed portion and defining a sealing space between the first substrate and the second substrate, wherein
   the recessed portion has a shape such that at least a part of a first projection line corresponding to the recessed portion is disposed at an outer area of a second projection line corresponding to the depressed portion, the first projection line is obtained by projecting a periphery of an open end of the recessed portion on the one surface of the first substrate, and the second projection line is obtained by projecting a boundary line between side walls of the depressed portion and the thin portion on the one surface of the first substrate, in the first substrate, a part of the thin portion which is disposed inside the periphery of the open end of the recessed portion provides a film portion and the film portion is displaceable in accordance with a physical quantity applied to the film portion, in the first substrate, a region between the film portion and a portion connected to the periphery of the open end of the recessed portion provides a stress release region, and a periphery end of the one surface of the first substrate is attached to a periphery end of the one surface of the second substrate.

2. The dynamic quantity sensor according to claim 1, wherein
the recessed portion has a shape such that the first projection line entirely surrounds the second projection line.

3. The dynamic quantity sensor according to claim 2, wherein,
a ratio of a length of the stress release region to a length of the film portion is set to be equal to or higher than 0.2,
the length of the film portion is defined as a shortest dimension of the film portion which passes through a center of the film portion, and
the length of the stress release region is defined as a shortest distance between the first projection line and the second projection.

4. The dynamic quantity sensor according to claim 1, wherein
the second substrate includes a substrate having one surface facing the first substrate and a joining member disposed on the one surface of the substrate,
the joining member is made of a material having a thermal expansion coefficient different from a thermal expansion coefficient of the substrate and a thermal expansion coefficient of the first substrate, and
the joining member is attached to the one surface of the first substrate.

5. The dynamic quantity sensor according to claim 1, wherein
the first substrate is provided by a semiconductor substrate including a supporting substrate, an insulating film, and a semiconductor layer stacked in order,
the depressed portion extends from one surface of the supporting substrate which is opposite to the insulating film and to the insulating film, and
the film portion is provided by a part of the insulating film and a part of the semiconductor layer, which are disposed in a vicinity of a bottom surface of the depressed portion.

6. The dynamic quantity sensor according to claim 1, wherein
the first substrate includes a semiconductor substrate and a pedestal attached to the semiconductor substrate,
the semiconductor substrate includes a supporting substrate, an insulating film, and a semiconductor layer stacked in order,
the depressed portion extends from one surface of the pedestal which is opposite to the supporting substrate to the supporting substrate, and
the film portion is provided by a part of the semiconductor substrate, which is disposed in a vicinity of a bottom surface of the depressed portion.

7. The dynamic quantity sensor according to claim 1, wherein
the first substrate includes a semiconductor substrate and a pedestal attached to the semiconductor substrate,
the semiconductor substrate includes a supporting substrate, an insulating film, and a semiconductor layer stacked in order,
the depressed portion is disposed on one surface of the pedestal which is disposed in a vicinity of the supporting substrate and another film portion is defined by the depressed portion, and
the another film portion is displaceable in accordance with a pressure applied to the pedestal on a surface opposite to the supporting substrate and defines a sealing space between the pedestal and the supporting substrate.

8. A dynamic quantity sensor comprising:
a first substrate having one surface, another surface opposite to the one surface, and a depressed portion defining a thin portion in a vicinity of the one surface; and
a second substrate having one surface attached to the one surface of the first substrate and a recessed portion, and the recessed portion being disposed in a vicinity of the one surface corresponding to the depressed portion and defining a sealing space between the first substrate and the second substrate, wherein
the recessed portion has a shape such that at least a part of a first projection line corresponding to the recessed portion is disposed at an outer area of a second projection line corresponding to the depressed portion, the first projection line is obtained by projecting a periphery of an open end of the recessed portion on the one surface of the first substrate, and the second projection line is obtained by projecting a boundary line between side walls of the depressed portion and the thin portion on the one surface of the first substrate,
in the first substrate, a part of the thin portion which is disposed inside the periphery of the open end of the recessed portion provides a film portion and the film portion is displaceable in accordance with a physical quantity applied to the film portion, and
in the first substrate, a region between the film portion and a portion connected to the periphery of the open end of the recessed portion provides a stress release region, wherein
the first substrate is provided by a semiconductor substrate including a supporting substrate, an insulating film, and a semiconductor layer stacked in order,
the depressed portion extends from one surface of the supporting substrate which is opposite to the insulating film and to the insulating film, and
the film portion is provided by a part of the insulating film and a part of the semiconductor layer, which are disposed in a vicinity of a bottom surface of the depressed portion.

9. A dynamic quantity sensor comprising:
a first substrate having one surface, another surface opposite to the one surface, and a depressed portion defining a thin portion in a vicinity of the one surface; and
a second substrate having one surface attached to the one surface of the first substrate and a recessed portion, and the recessed portion being disposed in a vicinity of the one surface corresponding to the depressed portion and defining a sealing space between the first substrate and the second substrate, wherein the recessed portion has a shape such that at least a part of a first projection line corresponding to the recessed portion is disposed at an outer area of a second projection line corresponding to the depressed portion, the first projection line is obtained by projecting a periphery of an open end of the recessed portion on the one surface of the first substrate, and the second projection line is obtained by projecting a boundary line between side walls of the depressed portion and the thin portion on the one surface of the first substrate, in the first substrate, a part of the thin portion which is disposed inside the periphery of the open end of the recessed portion provides a film portion and the film portion is displaceable in accordance with a physical quantity applied to the film portion, in the first substrate, a region between the film portion and a portion connected to the periphery of the open end of the recessed portion provides a stress release region, the first substrate includes a semiconductor substrate and a pedestal attached to the semiconductor substrate, the semiconductor substrate includes a supporting substrate, an insulating film, and a semiconductor layer stacked in order, the depressed portion extends from one surface of the pedestal which is opposite to the supporting substrate to the supporting substrate, and the film portion is provided by a part of the semiconductor substrate, which is disposed in a vicinity of a bottom surface of the depressed portion.

10. The dynamic quantity sensor according to claim 9, wherein the depressed portion is disposed on one surface of the pedestal which is disposed in a vicinity of the supporting substrate and another film portion is defined by the depressed portion.

11. The dynamic quantity sensor according to claim 10, wherein the another film portion is displaceable in accordance with a pressure applied to the pedestal on a surface opposite to the supporting substrate and defines a sealing space between the pedestal and the supporting substrate.

* * * * *